United States Patent
Ruge et al.

(10) Patent No.: US 6,186,541 B1
(45) Date of Patent: Feb. 13, 2001

(54) AIR BAG ARRANGEMENT WITH GAS FILTRATION

(75) Inventors: Hans-Peter Ruge, Baldham; Manfred Veigl, Freising-Hohenbachern; Markus Schels, Munich, all of (DE); David Stow, Wilmslow (GB); Franck Lebaudy, Lardy (FR)

(73) Assignee: Autoliv Development AB (SE)

( * ) Notice: Under 35 U.S.C. 154(b), the term of this patent shall be extended for 0 days.

(21) Appl. No.: 09/245,571

(22) Filed: Feb. 5, 1999

(30) Foreign Application Priority Data

Feb. 6, 1998 (DE) ............................................. 198 04 683

(51) Int. Cl.⁷ .................................................... B60R 21/26
(52) U.S. Cl. ........................... 280/736; 280/740; 280/742
(58) Field of Search ..................................... 280/741, 742, 280/740, 736

(56) References Cited

U.S. PATENT DOCUMENTS

| | | | |
|---|---|---|---|
| 4,137,847 | * 2/1979 | Osborne ................................ | 280/741 |
| 4,547,342 | * 10/1985 | Adams et al. ......................... | 422/166 |
| 5,062,367 | * 11/1991 | Hayashi et al. ....................... | 102/530 |
| 5,106,119 | * 4/1992 | Swann et al. ......................... | 280/731 |
| 5,482,316 | * 1/1996 | Lang et al. ............................ | 280/741 |
| 5,505,488 | 4/1996 | Allard . | |
| 5,753,852 | * 5/1998 | Bernau et al. ......................... | 102/530 |

FOREIGN PATENT DOCUMENTS

| | | |
|---|---|---|
| 196 17 538 C1 | 5/1996 | (DE) . |
| 196 18 040 A1 | 11/1997 | (DE) . |

* cited by examiner

Primary Examiner—Paul N. Dickson
(74) Attorney, Agent, or Firm—Robert W. Becker & Associates

(57) ABSTRACT

An air bag arrangement is provided, and includes a gas generator to which is connected an air bag. The gas generator has a combustion chamber for composite propellant, and walls of the combustion chamber are provided with discharge openings. A first filter unit is disposed in the gas generator housing and a second filter unit is disposed beyond the housing and surrounds the same at a distance to form a cooling and pressure-reduction zone for a gas stream coming from the first filter unit. The second filter unit separates out gaseous and/or liquid impurities resulting in a gas stream during combustion of the composite propellant in the combustion chamber. By reducing the temperature level of the gas stream and its pressure level to within the range of atmospheric pressure, the second filter unit effects a phase change of the gaseous and/or liquid impurities, whereby liquid and/or solid impurities are filtered out in the second filter unit. The gas stream then enters the air bag from the second filter unit.

4 Claims, 1 Drawing Sheet

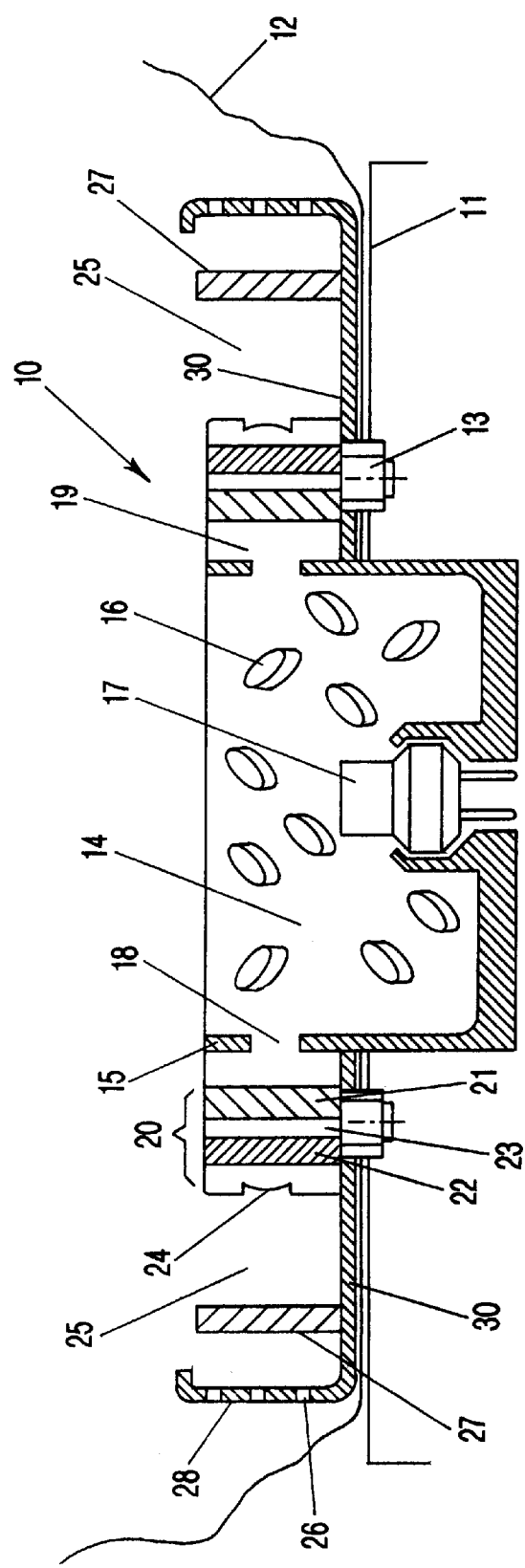

AIR BAG ARRANGEMENT WITH GAS FILTRATION

BACKGROUND OF THE INVENTION

The present invention relates to a gas bag or so-called air bag arrangement, and includes a gas generator that serves for generating gas and an air bag that is connected to the gas generator. The gas generator has a combustion chamber for receiving the propellant, with discharge openings being disposed in the wall of the combustion chamber, and at least one filter being provided that follows the combustion chamber such that, while forming a cooling zone, the generated gas flows out of the combustion chamber and via the filter into the air bag.

During the burning or combustion of propellants for the generation of the gas required for inflating the air bag, there exists the problem that the thereby resulting impurities attack the fabric of the air bag and to this extent can adversely affect the function of the air bag arrangement. In this connection, the occurrence of impurities is essentially a function of the chemical composition of the propellant that is used.

Several main groups of propellants are used. For example, a first group includes sodium azide propellants which at a combustion temperature of about 1400° C. produce only solid impurities that can be easily filtered out of the gas stream with a simple filter arrangement.

Included in a second group are nitro cellulose propellants that at a combustion temperature of about 2600° C. produce gasses that are nearly free of impurities and that thus require no mechanical filtration.

The subject matter of the present application is a third group of composite propellants that due to their chemical composition and the high combustion temperature of about 2500° C. produce liquid and gaseous particles as impurities that, due to the high flow velocities that result during the combustion, cannot at all or only to a very limited extent be mechanically filtered.

An air bag arrangement having the features initially mentioned is disclosed in U.S. Pat. No. 5,505,488. The gas generator of this arrangement has a first and a second filter element that each surround the wall of the combustion chamber in an annular fashion and are not spaced therefrom, and furthermore are intended to filter solid particles contained in the generated gas stream. Unfortunately, such a filter unit that directly adjoins the wall of the combustion chamber is not suitable for separating out impurities that are present in a liquid or gaseous phase from a gas stream generated by a composite propellant.

It is therefore an object of the present invention, for a gas generator operated with a composite propellant, to provide a filter unit by means of which liquid and/or gaseous impurities that result during combustion can be separated out.

BRIEF DESCRIPTION OF THE DRAWING

This object, and other objects and advantages of the present invention, will appear more clearly from the following specification in conjunction with the accompanying schematic drawing, which is a cross-sectional view of one exemplary embodiment of the inventive air bag arrangement with a gas generator.

SUMMARY OF THE INVENTION

The basic concept of the present invention is that to separate out gaseous and/or liquid impurities in the gas stream that result from the combustion of a composite propellant in the combustion chamber, a second filter means is provided that is disposed beyond the gas generator housing that accommodates the first filter means, and that surrounds the gas generator with a spacing that provides a pressure reduction zone for the gas stream, wherein the second filter means is disposed in such a way that by reducing the temperature level of the gas stream and by reducing the pressure level of the gas stream to within the range of atmospheric pressure, a phase change of the gaseous and/or liquid impurities is effected and the impurities, which are present in liquid and/or solid form, are filtered out in the second filter means. With the inventive arrangement of the filter unit, it is now also possible to retain liquid and/or gaseous impurities, so that composite propellants can be utilized to an increased extent.

To reduce pressure and temperature the inventive air bag arrangement has two filter means, namely a first known-type filter in the interior of the gas generator, and a newly designed second filter means that is spaced from the outer edge of the gas generator. The spacing serves for providing the cooling and pressure reduction zones. Upon operation of the gas generator, the first filter that is disposed in the gas generator cools the released gas and reduces the velocity thereof, and in addition imparts turbulence to the gas stream and effects an initially slight filtration since the impurities are still gaseous. After discharge of the hot gasses out of the housing of the gas generator a great reduction in pressure then immediately takes place due to the expansion of the gas stream in conjunction with an appropriate cooling. To the extent that composite propellants generally contain as oxidation materials metallic alkaline earth compounds, preferably nitrates of potassium or sodium, the impurities of which are gaseous under the high pressures and temperatures that exist in the interior of the gas generator, there results with the reduction in temperature and pressure a conversion of these gaseous impurities into a liquid or solid phase. Therefore, to begin with the present invention has the advantage that the first filter that is disposed in the interior of the gas generator can already have a simple construction since it is no longer necessary to place such high requirements on its filtration function as was necessary with the state of the art arrangements. The second filter means provided beyond the housing of the gas generator can have a straightforward construction since the gasses that flow through this second filter means already have a greatly reduced temperature and velocity so that the requirements with regard to temperature resistance and structural strength can be set much lower. For this reason, it is possible to use, for example, polymeric materials, ceramic or composite materials as the filter material for the second external filter means. Due to the extensive filtering-out of all impurities, and the low pressure and low temperature, the present invention provides the further advantage that previously necessary protective measures for the air bag, such as reinforcing inserts or silicone coatings in the region where the gas stream strikes, are no longer necessary, so that to this extent a further simplification of the construction of the air bag arrangement is provided.

In conformity with the teaching of the present invention, the arrangement of the second filter can be effected in such a way that impurities that are present in the gaseous phase can either be changed to the liquid phase and can be retained by the filter in this phase, or that at the same time a phase conversion from the gas phase into a solid phase is effected. To the extent that the impurities are present in liquid form, the arrangement of the second filter is such that a phase conversion into the solid phase is provided.

Further specific features of the present invention will be described in detail subsequently.

DESCRIPTION OF PREFERRED EMBODIMENTS

Referring now to the drawing in detail, the gas generator 10 is held on a carrier plate 11 via fastening means 13, whereby in the illustrated embodiment the mouth of the air bag 12 is securely held and clamped in position between the carrier member or plate 11 and the gas generator 10.

The gas generator 10 has a central combustion chamber 14 in which are accommodated the necessary propellant 16 as well as an ignition mechanism 17. Discharge openings 18, which are embodied as nozzle holes or jets, are disposed in the wall 15 of the combustion chamber 14; the gas generated in the combustion chamber 14 by burning up the propellant 16 can escape radially via the discharge openings 18. The wall 15 of the combustion chamber 14, accompanied by the formation of a space 19, is surrounded by a first filter 20. This first filter 20, in a known manner, comprises an inner first filter section 21 that faces the wall 15 of the combustion chamber 14, and a second filter section 22 that is spaced from the first filter section 21 as indicated by the arrow 23. After passsing through the first filter 20, the gas exits the gas generator 10 via discharge openings 24 and flows through the space 25 to the second filter 27. The second filter 27 serves for mechanical filtration of the gas stream and retains the impurities that are now in solid form. After flowing through the second filter 27, a portion of the gas stream strikes an upwardly bent outer rim 28 of a clamping ring 30, which serves for fixing the air bag in position and which is provided with discharge openings 26 for the radial passage of gas into the air bag, which in its starting position is folded up. As a result of the fact that the gas stream strikes the outer rim 28, a portion of the gas stream is also introduced axially into the air bag 12 parallel to the outer rim 28.

Whereas in the combustion chamber 14 of the gas generator 10 pressures of between 25 and 35 MPa occur, in the region of the first filter 20 there is a reduction of the pressure to a level of 5 to 10 MPa. After the gas stream leaves the gas generator housing, the resulting depressurization of the gas stream leads to a reduction of the pressure to within the proximity of the ambient pressure, to a value of about 1 MPa. In this pressure range, the desired conversion of the gaseous phase of the impurities into the solid state thereof takes place.

The specification incorporates by reference the disclosure of German priority document 198 01 683.9 of Feb. 6, 1998.

The present invention is, of course, in no way restricted to the specific disclosure of the specification and drawing, but also encompasses any modifications within the scope of the appended claims.

What I claim is:

1. An air bag arrangement for use with composite propellant, comprising:

a gas generator to which is connected an air bag, said gas generator having a combustion chamber for composite propellant, wherein wall means of said combustion chamber are provided with discharge openings;

first filter means disposed in a housing of said gas generator for receiving via said discharge openings gas generated in said combustion chamber; and second filter means disposed beyond said housing of said gas generator and surrounding same at a distance therefrom to thereby provide an empty space between said housing of said gas generator and said second filter means to form a cooling and pressure reduction zone for a gas stream from said first filter means, wherein said second filter means serves to separate out gaseous and liquid impurities resulting in said gas stream during combustion of said propellant in said combustion chamber, wherein said reduction zone serves, by reducing the temperature level of said gas stream, and by reducing the pressure level of said gas stream to within the range of atmospheric pressure, to effect a phase change of said gaseous and liquid impurities, whereby liquid and solid impurities are filtered out in said second filter means and wherein said gas stream enters said air bag from said second filter means.

2. An air bag arrangement according to claim 1, wherein for gaseous impurities said second filter means is disposed in such as way that a phase change into a liquid phase is effected.

3. An air bag arrangement according to claim 1, wherein for gaseous impurities said second filter means is disposed is such a way that a phase change into a solid phase if effected.

4. An air bag arrangement according to claim 1, wherein for liquid impurities, said second filter means is disposed in such a way that a phase change into a solid phase is effected.

* * * * *